United States Patent
Mantyla et al.

(10) Patent No.: US 10,180,260 B2
(45) Date of Patent: Jan. 15, 2019

(54) FLAPPER VALVE ADAPTOR FOR A ROOF VENT AND METHOD OF INSTALLING THE SAME

(71) Applicant: CANPLAS INDUSTRIES LTD., Barrie (CA)

(72) Inventors: James Brian Mantyla, Barrie (CA); Scott Baldwin, Midhurst (CA)

(73) Assignee: Canplas Industries LTD., Barrie, Ontario (CA)

( * ) Notice: Subject to any disclaimer, the term of this patent is extended or adjusted under 35 U.S.C. 154(b) by 256 days.

(21) Appl. No.: 14/932,389

(22) Filed: Nov. 4, 2015

(65) Prior Publication Data
US 2017/0122609 A1 May 4, 2017

(51) Int. Cl.
*F24F 7/02* (2006.01)
*E04D 13/17* (2006.01)
*F16K 24/04* (2006.01)

(52) U.S. Cl.
CPC .............. *F24F 7/025* (2013.01); *E04D 13/17* (2013.01); *F16K 24/04* (2013.01)

(58) Field of Classification Search
CPC ............. F24F 7/025; E04D 13/17; F16K 1/18
USPC ........................................................ 454/364
See application file for complete search history.

(56) References Cited

U.S. PATENT DOCUMENTS

| | | | | |
|---|---|---|---|---|
| 2,700,331 A | * | 1/1955 | Miller | F24F 7/025 454/230 |
| 3,181,451 A | * | 5/1965 | Hess | F01N 13/085 126/285 R |
| 3,866,950 A | * | 2/1975 | Skoch | F16L 21/002 285/136.1 |
| 4,144,802 A | | 3/1979 | Babin | |
| 4,432,273 A | | 2/1984 | Devitt | |
| 4,538,508 A | * | 9/1985 | Ballard | B21D 53/00 137/852 |
| 4,593,504 A | | 6/1986 | Bonnici et al. | |
| 4,750,411 A | * | 6/1988 | Eversole | F24F 13/0236 138/162 |
| 4,758,027 A | * | 7/1988 | Todd | F16L 25/0036 285/148.23 |

(Continued)

FOREIGN PATENT DOCUMENTS

| | | | | |
|---|---|---|---|---|
| CA | 2326371 C | * | 12/2006 | ............. E04D 13/17 |
| CA | 2696466 A1 | | 9/2010 | |

(Continued)

*Primary Examiner* — Gregory Huson
*Assistant Examiner* — Frances F Hamilton
(74) *Attorney, Agent, or Firm* — Hoffmann & Baron, LLP

(57) ABSTRACT

An adaptor for a passive roof vent is presented having a base securable to a roof deck and an integrally moulded stepped collar extending from the base on one side for connecting to different air duct sizes which defines a discharge end for an air flow passageway. A central well is defined by the collar adjacent to and below the base and is open towards the other side of the base and has a hinge pin for at least one flapper valve retained in the well below the base. At least one flapper valve, hinged to the hinge pin, pivots about a closed position to which the flapper valve is biased by gravity and an open position in which the flapper valve is opened by air pressure from below within the air flow passageway. The flapper valve remains partially within the well when the flapper valve is open.

20 Claims, 4 Drawing Sheets

(56) References Cited

U.S. PATENT DOCUMENTS

| | | | | |
|---|---|---|---|---|
| 5,323,804 A * | 6/1994 | Lin | | E03F 5/0407 |
| | | | | 137/362 |
| 5,344,363 A * | 9/1994 | Pollock | | B65D 90/34 |
| | | | | 137/527.8 |
| 5,383,816 A * | 1/1995 | Marcello | | F24F 7/013 |
| | | | | 454/359 |
| 5,394,663 A * | 3/1995 | Jackson | | E04D 13/17 |
| | | | | 285/43 |
| 5,662,522 A * | 9/1997 | Waltz | | E04D 13/17 |
| | | | | 454/359 |
| 5,722,181 A * | 3/1998 | Meyer | | D06F 58/20 |
| | | | | 34/235 |
| 5,749,780 A | 5/1998 | Harder et al. | | |
| 6,102,794 A * | 8/2000 | Cline | | F24F 7/02 |
| | | | | 454/368 |
| 6,149,516 A | 11/2000 | Mantyla | | |
| 6,293,862 B1 * | 9/2001 | Jafine | | F24F 7/02 |
| | | | | 454/359 |
| 7,780,510 B2 * | 8/2010 | Polston | | F24F 7/02 |
| | | | | 454/366 |
| 7,814,709 B1 * | 10/2010 | Resech | | E04D 13/1407 |
| | | | | 52/100 |
| 7,882,670 B2 * | 2/2011 | West | | E04D 13/1476 |
| | | | | 454/13 |
| 8,205,401 B2 * | 6/2012 | Ward | | F24F 7/02 |
| | | | | 454/367 |
| 8,209,923 B1 * | 7/2012 | Rich | | E04D 13/1476 |
| | | | | 285/42 |
| 9,416,986 B2 * | 8/2016 | Huber | | F24F 7/02 |
| 9,612,028 B2 * | 4/2017 | Chua | | |
| 2003/0047703 A1 * | 3/2003 | Patterson | | F02D 9/08 |
| | | | | 251/301 |
| 2005/0005541 A1 * | 1/2005 | West | | E04D 13/0325 |
| | | | | 52/198 |
| 2005/0202778 A1 * | 9/2005 | Stravitz | | F24F 13/1413 |
| | | | | 454/353 |
| 2006/0025067 A1 * | 2/2006 | Koessler | | F24F 7/02 |
| | | | | 454/359 |
| 2008/0233861 A1 * | 9/2008 | Jenkins | | F04D 25/14 |
| | | | | 454/241 |
| 2009/0023379 A1 * | 1/2009 | Bredahl | | F24F 13/082 |
| | | | | 454/267 |
| 2010/0257798 A1 * | 10/2010 | Ward | | F24F 7/02 |
| | | | | 52/301 |
| 2011/0312265 A1 * | 12/2011 | Leblanc | | F24F 13/1413 |
| | | | | 454/365 |
| 2014/0069964 A1 * | 3/2014 | Haynes | | B65D 83/0022 |
| | | | | 222/541.2 |
| 2015/0198343 A1 * | 7/2015 | Huber | | F24F 7/02 |
| | | | | 454/358 |
| 2015/0219358 A1 * | 8/2015 | Alfakhrany | | F24F 11/0001 |
| | | | | 454/256 |
| 2016/0131392 A1 * | 5/2016 | Mantyla | | F24F 13/082 |
| | | | | 454/353 |

FOREIGN PATENT DOCUMENTS

| | | | | |
|---|---|---|---|---|
| CA | 2870440 A1 * | 5/2016 | | F24F 13/082 |
| DE | 3016912 A1 * | 11/1984 | | F24F 7/02 |
| GB | 1309924 A * | 3/1973 | | F24F 7/025 |

* cited by examiner

FLAPPER VALVE ADAPTOR FOR A ROOF VENT AND METHOD OF INSTALLING THE SAME

FIELD OF THE INVENTION

This invention relates generally the field of roof vents, and more particularly to the type of roof vents that may be used to provide ventilation from a building enclosure. Most particularly this invention relates to the type of roof vents that may require a flapper valve, such as is common with forced air venting from, for example, bathroom fans, range fans and the like.

BACKGROUND OF THE INVENTION

Exhaust fans are often provided to suck moist air from bathrooms, smoke and steam from kitchens, and for other reasons. They are particularly useful in removing moist air from bathrooms where for example showering may take place which can create a great deal of steam. The removal of such moist air will limit the formation of mould or the like which can be a cleanliness and safety issue. Usually such bathroom fans are activated by a separate switch and can be turned on or off at will. Alternatively they may be automatically operated when there is enough moisture in the air or the bathroom is otherwise occupied. When activated the fan will suck air from the bathroom, usually at a ceiling level and then exhaust it to the outside through a dedicated exhaust duct. The fan creates a positive air flow that pushes the air out through the duct and then typically through a flapper valve, before it reaches the outside. The flapper valve typically opens by reason of the positive air pressure and then closes due to gravity.

Various types of vent structure exist to house the flapper valve at the discharge end of the duct. In general such vent structures typically include a body on the outside which covers the duct opening and prevents weather from entering backwardly through the duct. As well, typically the vent body includes a form of grill or the like to let air pass out while at the same time to keep out pests such as birds, bugs and rodents or the like from entering the building through the duct. As well, as noted above, they typically include a flapper valve to prevent the loss of air (and thus energy) out of the discharge end of the duct when the fan is not operating. Lastly they typically include some form of collar to anchor the duct in place to the body of the vent.

Although many prior designs of specialized vent bodies have been proposed in the past, in some cases roofers will cover the duct discharge end with a conventional passive roof vent. While this provides some protection for the discharge end of the duct it is generally not sufficient, in that there may be no provision of a flapper valve. Without a flapper valve this can lead to drafts in the bathroom and a loss of energy. The flapper doesn't allow the moist air to freeze. In a prior patent to Ward (U.S. Pat. No. 8,205,401), an attempt is made to provide a flapper adaptor so that a conventional passive roof vent can be adapted to perform as an end cover for a bathroom or forced air duct. In Ward there is provided a device which includes a separate flapper adaptor unit which defines a discharge chimney that extends up above the roof surface. A flapper valve hinged at an angle and attached at one end is provided on the top of the chimney. The flapper adaptor is provided with upwardly reaching fingers to allow it to be placed inside of the vent opening of the vent body and the grab the top edge of the same to keep it in place. Below a separate collar adaptor, with various collar diameters for attaching to different sizes of ducts, is provided. The separate collar adaptor, the flapper adaptor and the body of the vent are then combined together to form a complete unit.

While providing a flapper valve option for the specific roof vent design shown there are certain problems associated with this prior design. The design involves three separate components each of which must be positioned correctly to ensure the combination functions as required. The use of separate components leads to the risks of installer error and leaks. As well the flapper adaptor includes a raised collar which has an angled top on which the flapper valve sits. To ensure proper functioning of the flapper valve the valve must be oriented correctly, relative to the roof incline, to prevent the flapper valve from being too hard to lift. As well the flapper valve stands proud of the roof deck meaning that the body of the vent must be large enough to accommodate the range of travel of the flapper valve when it opens and closes and the adaptor fingers will only latch onto a vent having a vent opening as shown in the drawings. Thus this prior adaptor combination is limited to being used with a roof vent the same as or substantially the same as what is shown.

Other types of flapper valves provided in the prior art include:

U.S. Pat. No. 4,144,802;
U.S. Pat. No. 4,432,273;
U.S. Pat. No. 4,593,504;
U.S. Pat. No. 5,662,522;
U.S. Pat. No. 5,749,780;
Canadian Patent No. 2,696,466.

What is desired is a simple and reliable universal adaptor that can be used in association with many different types and styles of roof vent bodies. A universal adaptor is desirable as opposed to one which can only be used in association with one specific roof vent body as taught in the prior art. Preferably such a universal device would be simple to minimize the risk of incorrect installation and in-expensive to make and use. Preferably such a product can be installed from either side of the roof sheathing. Such a design is also preferably reliable. Most preferable such a device would be made from a durable molded plastic and would be compatible with a wide range of vent bodies.

SUMMARY OF THE INVENTION

The present invention is directed to a form of universal adaptor which may be used in association with many different vent body designs. Essentially the present invention may provide a reliable flapper valve element that can be mounted to the discharge end of an adaptive collar to connect to a forced air duct such as one coming from a bathroom fan. The present invention may present a low profile design, by mounting the flapper valve within the well formed by the adaptive collar. Preferably the design includes control over the extent of rotation of the flapper valve, through for example the use of limit stops. It may only require a low activation pressure for opening and closing the valve as compared to some of the prior art. In this way the present invention provides for an easy to use adaptor to mount on the end of a forced air discharge duct which is also efficient at permitting the desired discharge of exhaust air. The present invention may be molded from highly durable plastic and is easily retrofit to an existing installation and can be used with a wide variety of convention roof vent styles and forms.

According to one embodiment the present invention provides a flapper valve adaptor for a passive roof vent, the flapper valve adaptor comprising:

a base securable to a sloped roof deck and having an integrally moulded stepped collar extending from the base on one side for connecting to different air duct sizes and to define a discharge end for an air flow passageway, a central well defined by the collar adjacent to and below the base and being open towards the other side of the base from said one side;

a hinge pin retained in the open central well below said base to define a central pivot axis within said central well and oriented to be generally aligned with said roof deck slope when base is secured to said sloped roof deck;

a pair of opposed flapper valves hinged to said hinge pin and pivoting about a closed position in which the flapper valves is biased by gravity to close the air flow passageway and an open position in which the flapper valves are opened by air pressure from within said air flow passageway;

wherein said flapper valves, remain partially within said well when said flapper valves are fully open.

According to another aspect the present invention provides a method of installing a flapper valve assembly together with a passive exterior roof vent in a roof at a location having a generally planar surface which slopes down from a roof peak, said method comprising the steps of:

trimming a stepped collar having an integral base to match the diameter of an air duct to be vented;

securing the stepped collar to the air duct at one end and to a roof deck at the other end at said integral base;

securing a hinge pin in a central well of said stepped collar in an orientation that is generally perpendicular to a roof peak and generally below the planar roof surface;

pivotally securing flapper elements to said hinge pin; and mounting said exterior roof vent over said flapper valve adaptor.

BRIEF DESCRIPTION OF THE DRAWINGS

Reference will now be made by way of example only to preferred embodiments of the invention by reference to the following drawing in which.

DETAILED DESCRIPTION OF THE PREFERRED EMBODIMENTS

Figure 1:
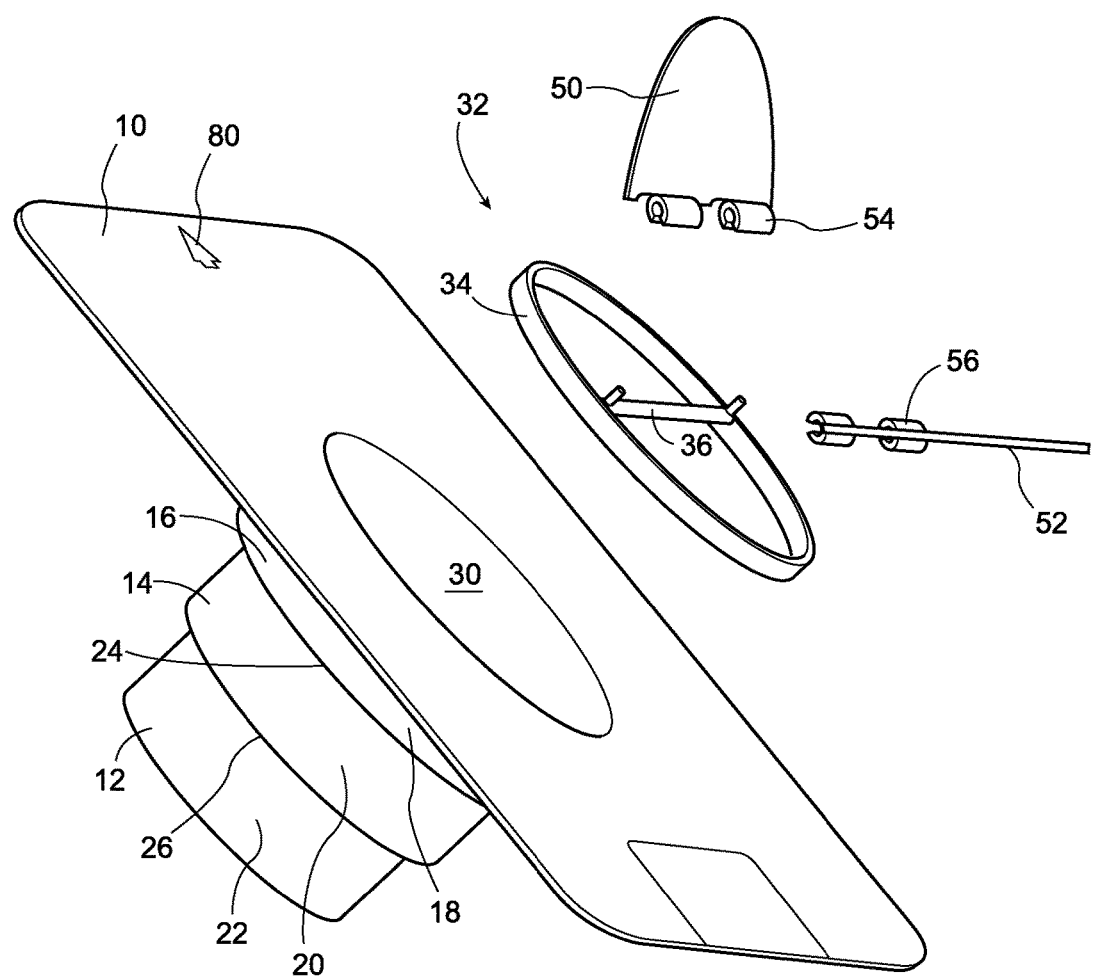
FIG. 1 is an exploded view of the components of an adaptor collar assembly according to one embodiment of the present invention.

FIG. 1 shows an adaptor collar according to the present invention. As shown the adaptor collar has an attachment base 10 from which extend number of different sized collars 12, 14, and 16. Each collar section is comprised of a duct attachment portion 18, 20 and 22 separated by horizontal steps 24 and 26. The smallest diameter connector 12 is the furthest from the base 10 and each successive connector section 14, 16 is of a larger diameter. Three sizes are believed to cover the usual range of ducts that might be used in typical duct work in a building. It will be understood that the collar sections that are too small to match the air duct which attaches to the adaptor may be trimmed off before the air duct connection is made.

It will also be understood that the duct collar sections 12, 14, and 16 are integrally moulded to each other and the last or largest one 16 is integrally moulded to the base 10. In this way once the duct is attached to the appropriate sized collar 12, 14 or 16, the adaptor collar forms a direct airway connection to the outside. The base 10 can be mounted on the inside or outside of a building enclosure such as by being incorporated into a shingle roof for example, with the collar extending downwardly through an opening in the roof and down towards a connecting air duct so that a connection can be made.

As shown each collar consists of a generally vertical sidewall section 18, 20 and 22 separated by generally horizontal sections or steps 24 and 26. The generally vertical sidewall sections 18, 20 and 22 may be tapered to make it easier to secure the duct over the collar sections. In this case the taper may extend from a narrower diameter further from the base 10 to a larger diameter closer to the base 10. The horizontal sections simply transition the collar diameter from one size to the next. The steps 24, 26 could be placed at an angle, rather than being at 90 degrees to the collar section, but the 90 degree configuration works well and is convenient to mould and so is the most preferred.

The largest collar section 16 is located just below the base 10. It will be understood that in all cases this collar section will be in use once the duct is attached, as it is the largest size collar. If the duct is to attach to a smaller sized collar then the duct is attached before the largest collar section. If the duct attaches to the middle collar section then the smallest collar section will be trimmed off and the only the middle and largest collar section will remain. Finally if the duct attaches to the largest collar section the first two sections are trimmed off and only the largest collar section remains. As explained in more detail below, the collar sections 14 and 12 are removed, but the section 18 and step 24 are kept.

As shown in FIG. 1 the largest collar section forms a well 30 below the base although the well may be any shape in plan view, a circular well is preferred as most air ducts are also circular. Thus, the circular well provides an outer surface which can be easily fit and made air tight with a connecting circular air duct.

FIG. 1 shows a flapper valve hinge pin assembly 32. It consists of a retaining ring 34, a hinge pin 36 extending across the diameter of the retaining ring 34. Preferably the retaining ring 34 and hinge pin 36 are formed from moulded plastic which has some resiliency. The retaining ring 34 may have an external diameter which matches the internal diameter of the well 30 just above the step 24. In this way the retaining ring 34 may be fit inside of the well 30. Detents 35 (see FIG. 2) may be used to secure the retaining ring 34 within the well 30. Thus, in one embodiment the retaining ring 34 may be pushed down into the well by an installer and snap fit over the detents to be physically retained in the well 30. The present invention comprehends various ways of securing the retaining ring 34 within the well including fasteners, adhesives, plastic welding and even a simple frictional or interference fit and the like, but it is believed that the preferred form of securing the retaining ring in the well is through a deflection over the detents as described above. As well, although good results have been achieved with the retaining ring as described the present invention comprehends various ways that the hinge pin 36 may be secured within the well. For example the hinge pin 36 could be made a simple straight member that fits into slots in the side walls of the collar for example. All that is required is a hinge pin 36 that can be aligned with the roof slope (namely, generally perpendicular to the roof peak and sloped parallel to the plane of the roof slope) to permit the smooth functioning of the flapper valves as described below.

Also shown are two flapper valves 50 and 52. Each of the flapper valves includes a pair of snap connectors for securing the flapper valves to the hinge pin. Each of the flapper valves has a generally semicircular shape and the snap connectors 54 of one are offset relative to the snap connectors 56 of the other. In this way they can be attached to the hinge pin from opposite sides to form a circular flapper valve which covers the airflow passageway through the well 30. It can now be appreciated that the step 24 acts as a valve seat for the outer edges of the flapper valves 50, 52. In this way the flapper valves close off the air passageway through the well 30 around the full circumference of the central well 30.

The snap connectors 54, 56 are sized and shaped to retain the flapper valves onto the hinge pin, but are loose enough so that the flapper valves can freely pivot about the hinge pin 36. In this way the present invention provides a split flapper valve in which each half is smaller in weight than one which needs to cover the whole opening and thus easier to lift off the valve seat or step 24 than a full circular flapper valve as shown in the prior art. As well the preferred form of the flapper valves is a moulded plastic part which then rotates on and off of the valve seat according to the air pressure from below. The use of light weight plastic parts reduces if not substantially eliminates the noise that can be associated with other types of valves which constantly open and close and make a noise each time.

Figure 2:
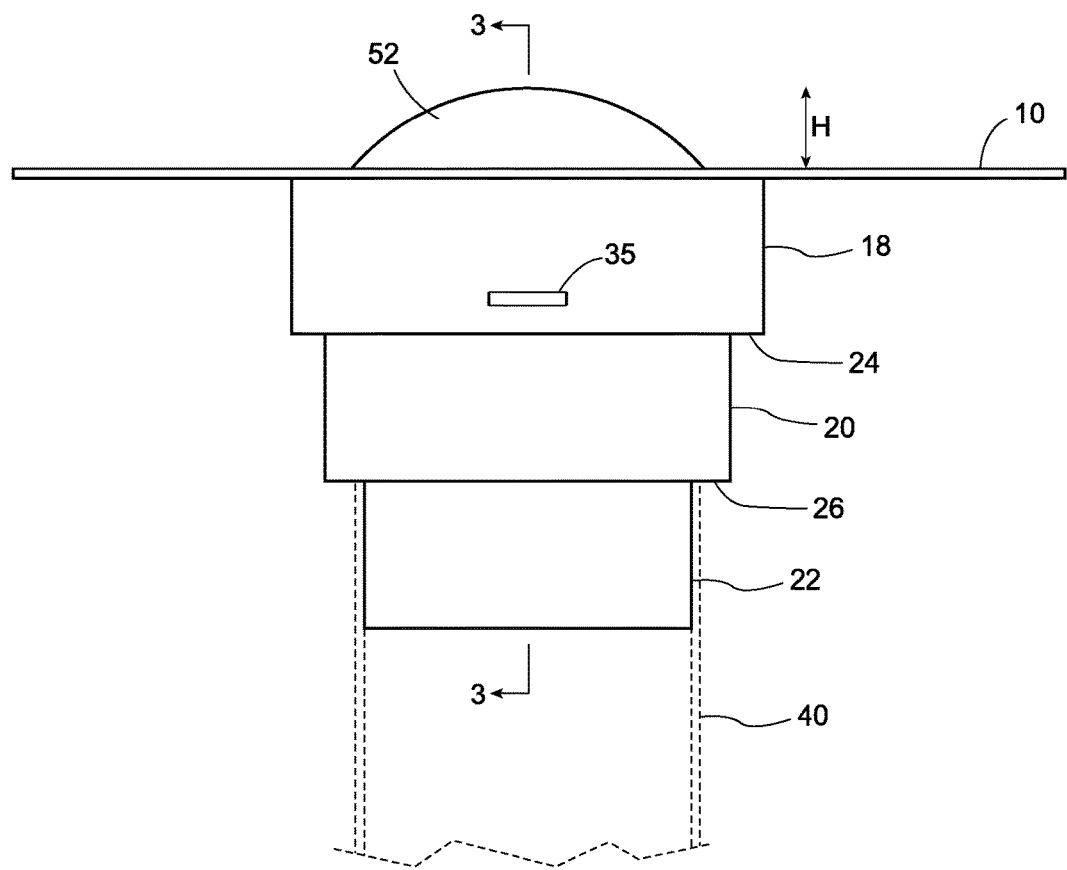
FIG. 2 is a side view of the components of FIG. 1 assembled together.

As can be seen in FIG. 2 the valves when fully open only project a small amount H above the base 10 of the vent. In this way the adaptor assembly of the present invention will fit below all manner of exterior roof vent styles and designs. In terms of sizes, the steps 18, 20 and 22 may be each made 1.5 inches long. Further, the diameter of the bottom of step 22 may be 3.9 inches, the next step 4.9 inches and the last step 5.9 inches, with a 1° vertical taper. A duct 40 is shown in dotted outline connecting to the smallest duct connector 12 by way of example.

Figure 3:
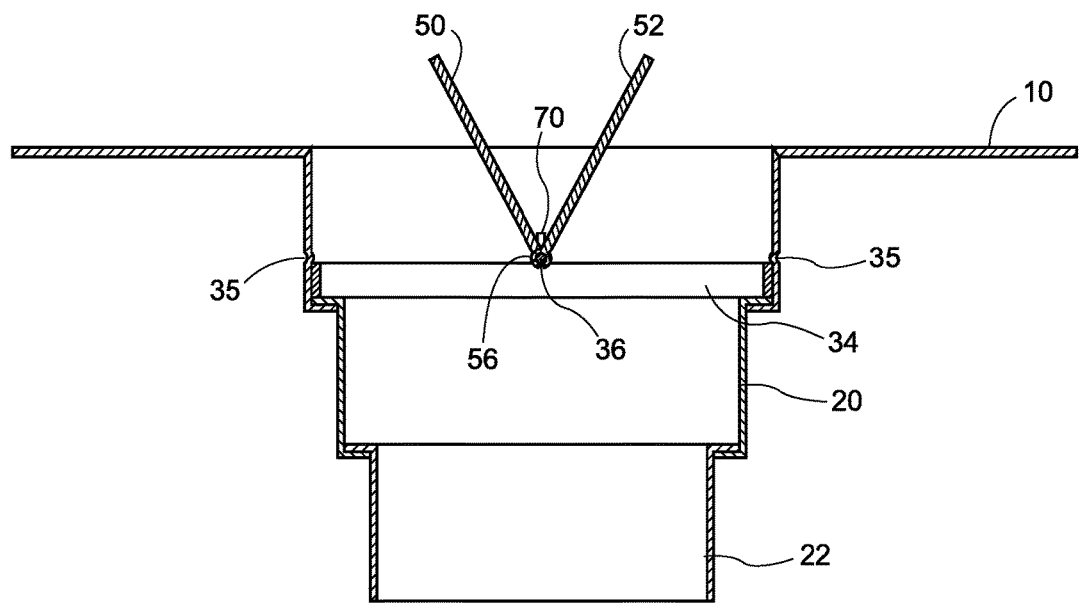
FIG. 3 is a cross-sectional end view of the components of FIG. 2.
Figure 4:
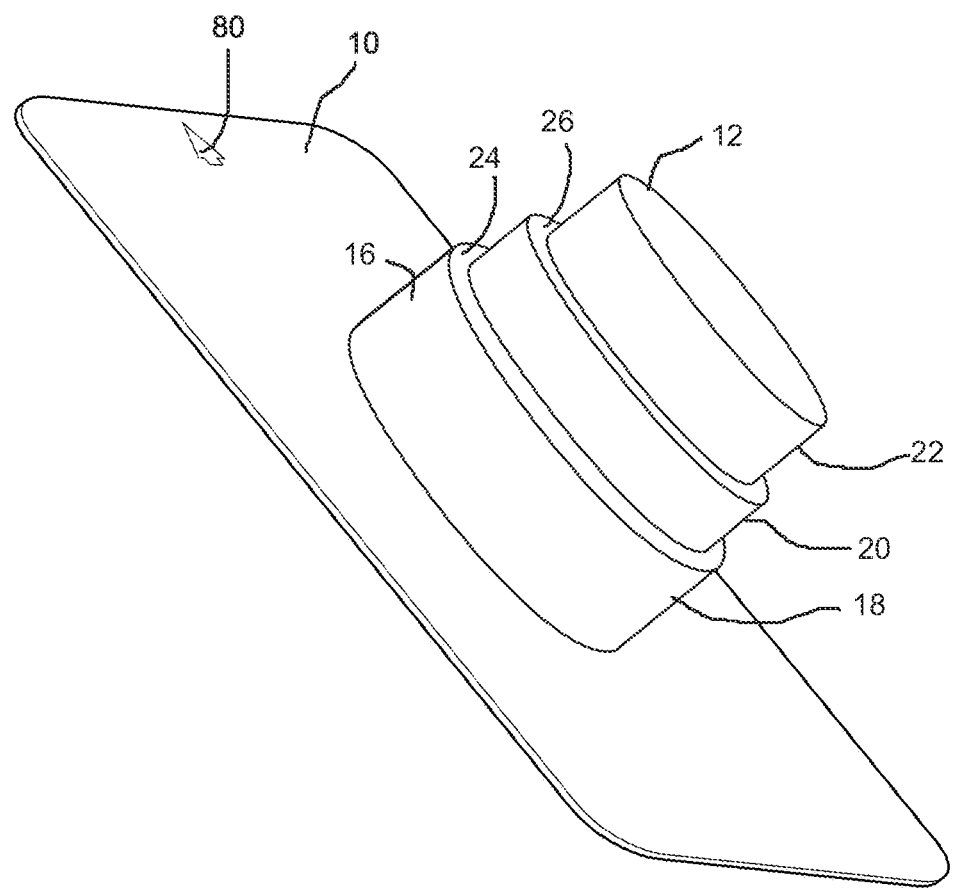
FIG. 4 is a perspective view showing the bottom side the adaptor collar assembly of FIG. 1.

FIG. 3 is a cross-section along lines 3-3 of FIG. 2 of the present invention. As shown, rotation stops 70 may be formed into the snap fittings 54, 56 to limit the over rotation of the flapper valves. This has two desired effects including preventing the valves from getting to upright in which case they may have a tendency not to properly close and to prevent the tops of the valves from protruding very far above the surface of the base making the present design a low profile design which is compatible with many vent body styles which may be used to cover the flapper valve adaptor. While any range of angles can be used, reasonable results have been obtained by limiting the range of motion to less than about 60° and most preferably to about 45°.

The installation of the present invention can now be understood. The first step is to locate the ducting to be vented and to form a hole in the roof deck at an appropriate location. Then the adaptor collar can be sized to the ducting by removing any collar sections that are too small. The removal can be done with a knife, scissors, sheers, snips or the like as the plastic material while durable can be fairly easily cut. An area of thinner plastic can be molded into the adaptor to facilitate such trimming. The next step is to attach the duct to the appropriate collar using convention methods which might include glue, adhesive, a duct clamp and the like. Once the duct is secure the duct can be fed back down through the hole and the base 10 secured to the roof in the normal manner. As shown in FIG. 1, markings 80 can be provided to assist the installer in lining up the base. The base may be provided with visual markings to help the installer orient the base correctly, such as having an Up arrow formed into the plastic or added by way of a label on both sides of said base 10 so it can be correctly installed either above or below the roof deck as the installer wishes. In the case of an outside installation, the next step is the interleaving of the base 10 into a layers shingle covering in the usual manner to ensure that the base is part of a waterproof roof surface covering the underlying roof deck.

The next step is to insert and align the hinge pin. Typically a roof surface will have a certain incline or slope. There is also typically a roof peak, and a generally planar roof surface which slopes down and away from the roof peak towards the eaves. In this way water is encouraged by gravity to drain off the roof, into the eaves and then through downspouts onto the ground. What is desired is to orient the hinge pin so that it follows the slope or fall line. This is desired to keep the flapper valves balanced and to prevent the flapper valves from being oriented in a way that would require more effort to raise one flapper valve 50 as compared to the other one 52, for example when the air pressure in the duct below the vent is raised by means of a bathroom exhaust fan or the like. By aligning the hinge pin at generally at about 90° to the roof peak, and parallel to the slope of the planar roof surface the activation pressure required for each flapper valve will be generally evenly balanced. The flapper valves 50, 52 can be tested by turning on the fan, such as a bathroom fan or range fan, to make sure the air pressure is enough to open the flapper valves 50, 52 to the desired angle. The limit stops effectiveness can also be evaluated. Then, the next step is to place a conventional exterior roof vent overtop of the base to complete the installation. As noted above the low profile H of the adaptor of the present invention makes it suitable for many different forms of exterior roof vent.

It can now be appreciated that the present invention provides a simple and easy to use adaptor which can be placed into the air flow passageway of an air duct exhaust system to add a flapper valve closure to the air flow passageway. The present invention may be used with many different styles and types of exterior roof vent and is inexpensive and easy to install. Rather than requiring a dedicated type of exterior roof vent body for the flapper valve, the present invention can be used with any conventional mass market style of exterior roof vent, that provides a modest amount of head space below the raised cover. Further, by orienting the hinge pin axis generally perpendicular to the roof slope, the valve configuration permits the use of two smaller half valves, which will have substantially identical activation air pressures, and such activation air pressures will be substantially the same across the normal range of conventional roof slopes. In contrast the eccentric mounting of the hinge axes of the prior art can result in larger changes in activation pressure across the range of roof typical roof slopes.

It will be understood by those skilled in the art that various modifications and alterations can be made without departing from the broad scope of the appended claims. Some of them have been discussed above and other will be apparent to those skilled in the art. For example although a hinge pin support ring is shown, the hinge pin could be supported in a number of other ways. All that is required is the ability to orient the hinge pin to the slope to even out the resistance to air pressure provided by both halves of the split flapper valve.

We claim:

1. A flapper valve adaptor for a passive roof vent, said flapper valve adaptor being securable to a roof of a building enclosure and adapted to allow exhaust air to be discharged from inside said building enclosure to outside said building enclosure, the flapper valve adaptor comprising:
    an attachment base having a top side, a bottom side, and a discharge opening through said attachment base, said attachment base being securable to said roof;
    a collar having one end attached to said bottom side of said attachment base in communication with said discharge opening, and a free end extending outwardly from said bottom of said attachment base, said collar being sized and shaped to pass through an opening in said roof to connect said free end to an air duct located inside said building enclosure;
    an air flow passageway defined by said collar between said discharge opening of said attachment base and said free end of said collar;
    a central well positioned in said air flow passageway adjacent to said discharge opening of said attachment base;
    a hinge pin positioned in said central well, across said air flow passageway, dividing said central well into two substantially equal halves;
    a hinge pin retaining ring retaining said hinge pin, said hinge pin retaining ring being rotatably retained in said central well;
    a pair of opposed flapper valves hingedly attached to said hinge pin to allow said pair of opposed flapper valves to pivot between a closed position covering said air flow passageway, and an open position uncovering said air flow passageway;
    wherein said pair of flapper valves are biased to said closed position by gravity, and movable to said open position by positive air pressure inside said air flow passageway;
    wherein said pair of flapper valves remain at least partially within said central well when said pair of flapper valves are in said open position; and
    wherein said hinge pin retaining ring allows an installer to rotate said hinge pin retaining ring to orient said hinge pin relative to said attachment base so that said hinge pin is aligned with a slope of said roof when said attachment base is secured to said sloped roof.

2. The flapper valve adaptor as claimed in claim 1, wherein said central well includes detents extending inwardly to retain said retaining ring in place.

3. The flapper valve adaptor as claimed in claim 2, wherein said retaining ring is sufficiently flexible to permit said retaining ring to be snap fit over said detents and into place in said central well.

4. The flapper valve adaptor as claimed in claim 1, wherein said flapper valves have a semi circular shape.

5. The flapper valve adaptor as claimed in claim 4, wherein said flapper valves are placed on opposite sides of said hinge pin and have offset hinge assemblies.

6. The flapper valve adaptor as claimed in claim 5, wherein said offset hinge assemblies are adapted to snap fit onto said hinge pin.

7. The flapper valve adaptor as claimed in claim 6, wherein said central well comprises detents to prevent said flapper valves from rotating to vertical.

8. The flapper valve adapter as claimed in claim 5, wherein said offset hinge assemblies comprise rotation stops to limit a maximum angle of said flapper valves when in said open position, relative to said closed position.

9. The flapper valve adapter as claimed in claim 8, wherein said maximum angle is about 45° to about 60°, relative to said closed position.

10. The flapper valve adaptor as claimed in claim 1, wherein said hinge pin has a length that is substantially equal to a diameter of said central well.

11. The flapper valve adaptor as claimed in claim 10, wherein said central well has a depth that is at least 50% of a radius of said flapper valves.

12. The flapper valve adaptor as claimed in claim 1, wherein said attachment base comprises visual markings on one or both of said top side and said bottom side so that the visual markings are visible to an installer when said attachment base is being secured to said roof from either above or below the roof to indicate a correct orientation of said attachment base relative to said roof.

13. A method of installing a flapper valve assembly together with a passive exterior roof vent in a roof at a location having a generally planar surface which slopes down from a roof peak, said method comprising the steps of:
    providing the flapper valve adaptor of claim 1;
    trimming a stepped collar having an integral base to match the diameter of an air duct to be vented;
    securing the stepped collar to the air duct at one end and to a roof deck at the other end at said integral base;
    securing a hinge pin in a central well of said stepped collar in an orientation that is generally perpendicular to a roof peak and generally below the planar roof surface;
    pivotally securing flapper elements to said hinge pin; and
    mounting said exterior roof vent over said flapper valve adaptor.

14. The flapper valve adaptor as claimed in claim 1, wherein said collar is a stepped collar, integrally molded with said attachment base and adapted to connect to air ducts having different sizes.

15. The flapper valve adaptor as claimed in claim 14, wherein the stepped collar includes at least three collar sizes and is frangible to remove any collar sizes that are too small to connect to said air duct.

16. The flapper valve adaptor as claimed in claim 15, wherein the central well is defined by the largest sized collar of said stepped collar.

17. The flapper valve adaptor as claimed in claim 16, further comprising a hinge pin retaining ring retaining said hinge pin, said hinge pin retaining ring being sized and shaped to fit within an internal diameter of said largest sized collar, and being positioned between a) said attachment base, and b) a first step of said stepped collar, relative to said attachment base.

18. The flapper valve adaptor as claimed in claim 1, wherein said hinge pin is oriented relative to said attachment base so that said hinge pin will be aligned with a slope of said roof when said attachment base is secured to said sloped roof.

19. A flapper valve adaptor for a passive roof vent, said flapper valve adaptor being securable to a roof of a building enclosure and adapted to allow exhaust air to be discharged from inside said building enclosure to outside said building enclosure, the flapper valve adaptor comprising:
    an attachment base having a top side, a bottom side, and a discharge opening through said attachment base, said attachment base being securable to said roof;
    a collar having one end attached to said bottom side of said attachment base in communication with said discharge opening, and a free end extending outwardly from said bottom of said attachment base, said collar being sized and shaped to pass through an opening in said roof to connect said free end to an air duct located inside said building enclosure;

an air flow passageway defined by said collar between said discharge opening of said attachment base and said free end of said collar;

a central well positioned in said air flow passageway adjacent to said discharge opening of said attachment base;

a hinge pin positioned in said central well, across said air flow passageway, dividing said central well into two substantially equal halves;

a hinge pin retaining ring retaining said hinge pin within said central opening;

detents extending inwardly from said central well to retain said retaining ring in said central opening; and a pair of opposed flapper valves hingedly attached to said hinge pin to allow said pair of opposed flapper valves to pivot between a closed position covering said air flow passageway, and an open position uncovering said air flow passageway;

wherein said pair of flapper valves are biased to said closed position by gravity, and movable to said open position by positive air pressure inside said air flow passageway; and wherein said pair of flapper valves remain at least partially within said central well when said pair of flapper valves are in said open position.

20. A method of installing a flapper valve assembly together with a passive exterior roof vent in a roof at a location having a generally planar surface which slopes down from a roof peak, said method comprising the steps of:

providing the flapper valve adaptor of claim 19;

trimming a stepped collar having an integral base to match the diameter of an air duct to be vented;

securing the stepped collar to the air duct at one end and to a roof deck at the other end at said integral base;

securing a hinge pin in a central well of said stepped collar in an orientation that is generally perpendicular to a roof peak and generally below the planar roof surface;

pivotally securing flapper elements to said hinge pin; and mounting said exterior roof vent over said flapper valve adaptor.

* * * * *

UNITED STATES PATENT AND TRADEMARK OFFICE
CERTIFICATE OF CORRECTION

| | | |
|---|---|---|
| PATENT NO. | : 10,180,260 B2 | Page 1 of 1 |
| APPLICATION NO. | : 14/932389 | |
| DATED | : January 15, 2019 | |
| INVENTOR(S) | : James Brian Mantyla and Scott Baldwin | |

It is certified that error appears in the above-identified patent and that said Letters Patent is hereby corrected as shown below:

In the Specification

Column 1
Line 7: "generally the field" should read -- generally to the field --.
Line 35: "structure exist" should read -- structures exist --.
Line 66: "the grab" should read -- to grab --.

Column 2
Line 66: "convention" should read -- conventional --.

Column 3
Line 52: "the bottom side the" should read -- the bottom side of the --.
Line 60: "extend number" should read -- extend a number --.

Column 6
Line 9: "layers" should read -- layered --.
Line 61: "other" should read -- others --.

Signed and Sealed this
Twenty-seventh Day of August, 2019

Andrei Iancu
*Director of the United States Patent and Trademark Office*